United States Patent [19]
Kerst et al.

[11] 3,753,362
[45] Aug. 21, 1973

[54] 4,5 DIAMINOURACIL SULFATE AS ALGICIDE

[75] Inventors: Al F. Kerst; John D. Douros, Jr., both of Littleton, Colo.

[73] Assignee: The Gates Rubber Company, Denver, Colo.

[22] Filed: Nov. 9, 1970

[21] Appl. No.: 88,095

[52] U.S. Cl. ................................................ 71/67
[51] Int. Cl. ........................ A01n 9/22, A01n 15/00
[58] Field of Search .................................. 71/67, 92

[56] References Cited
OTHER PUBLICATIONS

Foley et al., Annals of the New York Academy of Sciences; Vol. 76, pp. 413–441 (1958).

Chemical Abstracts, Index 12082, 1959 & Foley et al., Chemical Abstracts, Vol. 53, Col. 9357F (1959).

*Primary Examiner*—James O. Thomas, Jr.
*Attorney*—Raymond Fink, H. W. Oberg, Jr. and Curtis H. Castleman, Jr.

[57] ABSTRACT

4,5 diaminouracil sulfate can be used to inhibit and/or prevent the growth of many undesirable forms of algae. This invention is particularly concerned with the algicidal properties of 4,5 diaminouracil sulfate against the algae species Scenedesmus, Plectonema, Anabaena, Ankistrodesmus, Oscillatoria, Coccochloris, Chlamydomonas, Lyngbya, Synura, and Chlorella.

12 Claims, No Drawings

4,5 DIAMINOURACIL SULFATE AS ALGICIDE

BACKGROUND OF THE INVENTION

The demand for both general and selective algicides has become more acute as greater demands are put upon existing water supplies. The chemical arts have produced a variety of compounds which have proved to be useful in controlling many algae species responsible for various nuisance and health problems. Water treatment researchers such as Palmer, C. and Maloney, T., *Ohio Jour. of Sci.*, 55, 1 (1955) and Sawyer, C., *Jour. of Water Pollution Control Federation*, 34, 279 (1962) have reported the use of a wide variety of chemical algicides such as copper sulphates, chlorine, quaternary ammonium, rosin amines, quinones, activated silver antibiotics and organic zinc compounds. Representative patented algicidal compounds can be found in U.S. Pat. Nos. 2,999,810; 3,052,594; 3,396,158 and 3,481,730. The water treatment literature does not however disclose the novel algicidal properties of 4,5 diaminouracil sulfate.

SUMMARY OF THE INVENTION

According to the present invention, it has been found that 4,5 diaminouracil sulfate

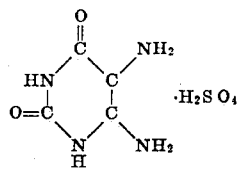

is a very effective algicidal agent. This compound has been known to the chemical art for many years and references to various synthetic procedures for preparing it have been reported. The material used in this study was prepared following the procedures described by H. Bredereck, I. Hennig and W. P. Fleiderer, *Chemische Berichte*, 86,321 (1953).

UTILITY OF THE INVENTION

The presence of algae in water can result in such deleterious effects as rampant plant growth, health hazards, discoloration, bad taste and odor as well as blockage of pipes, filters, tanks and similar equipment. The applicants have discovered that 4,5 diaminouracil sulfate compounds can be used to inhibit the growth of a wide variety of algae species which cause these water supply problems. For example, the compounds may be employed against: (1) taste and odor causing algae such as Anabaena and Synura; (2) filter clogging algae such as Chlorella and Oscillatoria; (3) polluted water algae such as Lyngbya, Chlamydomonas, Anabaena and Oscillatoria; (4) clean water algae such as Ankistrodesmus and (5) surface water algae such as Scenedesmus.

DESCRIPTION OF THE PREFERRED EMBODIMENTS

The algicidal effectiveness of 4,5 diaminouracil sulfate against these species is determined by the following test. Algal cultures representing Scenedesmus, Chlorella, Plectonema, Anacystis, Ankistrodesmus, Anabaena, Synura, Oscillatoria, Chlamydomonas Coccochloris and Lyngbya are each maintained in Chu No. 10 Broth Medium (Clacium nitrate, 0.040 grams; Potassium phosphate, 0.010 grams; Magnesium sulphate, 0.025 grams; Sodium carbonate, 0.020 grams; Sodium silicate, 0.025 grams; Ferric citrate, 0.003 grams; Citric acid, 0.003 grams and deionized water, 1,000 ml.) in the presence of sunlight. Hardened Chu No. 10 Agar plates are inoculated with cotton swabs saturated with the respective algae broth cultures. The 4,5 diaminouracil sulfate is tested by impregnating filter paper discs (1.27 cm. in diameter, No. 740–E, Schleicher and Schuell, Keene, New Hampshire) with 0.08 ml of a 4,5 diaminouracil sulfate solution. The saturated filter discs are then placed on the surface of the seeded agar plates and the optimum broth temperature of 25° to 27° C. is maintained. Untreated control plates are used as a basis of comparison and these exhibit profuse algal growths. The results of these tests are expressed as algal growth inhibition zone diameters expressed in centimeters.

ALGAL SCREEN

Compound: 4,5 diaminouracil sulfate

| Algae | Zones of Inhibition at concentrations indicated | | |
|---|---|---|---|
| | 500 ug/disc | 100 ug/disc | 50 ug/disc |
| Scenedesmus basilensis Taft EEC–83 | 4.9 | 3.2 | 0 |
| Scenedesmus obliquus Taft EEC–92 | 2.9 | 2.3 | 2.0 |
| Scenedesmus obliquus SRI | 4.3 | 2.7 | 0 |
| Chlorella ellipsoidea Taft EEC–95 | 3.3 | 2.2 | 0 |
| Chlorella pyrenoidosa Taft EEC–121 | 3.4 | trace | 0 |
| Chlorella pyrenoidosa ATCC–11469 | 3.2 | 2.3 | 0 |
| Chlorella vulgaris ATCC–9765 | 3.9 | 2.5 | 0 |
| Plectonema notatum Taft EEC–172 | 3.3 | 2.1 | 0 |
| Anacystis nidulans Taft EEC–134 | 2.8 | 2.0 | 0 |
| Ankistrodesmus var. acicularis Taft EEC–28 | 3.3 | 0 | 0 |
| Anabaena catenula SRI | 3.5 | 1.8 | 0 |
| Synura ulvella UI | 3.0 | trace | 0 |
| Oscillatoria corneti UI | 3.0 | 1.7 | 0 |
| Coccochloris elebans SRI | 2.7 | trace | 0 |
| Chlamydomonas radiati UA | 2.9 | 1.7 | 0 |
| Lyngnya sp. Taft EEC–166 | 3.2 | 2.8 | 2.4 |

Those skilled in the art will recognize that the scope of this invention should not be limited to the particular species of the above genera. For instance, the noted activity of 4,5 diaminouracil sulfate acid against Chlorella species suggests that the compound will also prove to be of value against many other Chlorella species. Similar possibilities exist for species of other genera whose activity was shown to be arrested by this compound. It should also be recognized that other appropriate algae genera may well afford additional opportunities to further define the degree and spectrum of the algicidal activity disclosed in this invention. Since no firm procedure can be laid down for the sequencing of such evaluations, or for a selection among the more than 20,000 known algae species, the 4,5 diaminouracil sulfate compounds of this invention must be considered on the basis of their demonstrated performance in these primary evaluations and then progressively judged in subsequent studies.

Subsequent evaluations should include but not be limited to the following algae genera.

Taste and Odor Causing Algae Genera

| | | |
|---|---|---|
| Asterionella | Peridinium | Nitella |
| Anabaena | Mallomonas | Dinobryon |
| Microcystis | Aphanizomenon | Volvox |
| Uroglenopsis | Staurastrum | Pandorina |
| Hydrodictyon | Ceratium | Synura |

Synedra           Coelosphaerium

Clean Water Algae Genera

| | | |
|---|---|---|
| Rhizoclonium | Merismopedia | Meridion |
| Pinnularia | Aphanothece | Chromulina |
| Cladophora | Ulothrix | Phacotus |
| Rhodomonas | Novicula | Staurastrum |
| Surirella | Chamaesiphon | Lemanea |
| Cyclotella | Micrasterias | Cocconeis |
| Chrysococcus | Calothrix | Microcoleus |
| Ankistrodesmus | | |

Polluted Water Algae Genera

| | | |
|---|---|---|
| Arthrospira | Tetraedron | Anabaena |
| Merismopedia | Euglena | Phacus |
| Phormidium | Spirogyra | Gloeocapsa |
| Carteria | Chlorococcum | Stigeoclonium |
| Lepocinclis | Oscillatoria | Gomphonema |
| Nitzschia | Lyngbya | Chlamydomonas |
| Chlamydobotrys | | |

Filter Clogging Algae Genera

| | | |
|---|---|---|
| Anabaena | Closterium | Spirogyra |
| Chroococcus | Tabellaria | Trachelomonas |
| Dinobryon | Rivularia | Asterionella |
| Cymbella | Melosira | Palmella |
| Chlorella | Cyclotella | Diatoma |
| Synedra | Navicula | Fragilarai |
| Tribonema | Oscillatoria | |

Surface Water Algae Genera

| | | |
|---|---|---|
| Actinastrum | Euastrum | Zygnema |
| Nodularia | Gonium | Stauroneis |
| Coelastrum | Desmidium | Sphaerocystis |
| Euglena | Pediastrum | Scenedesmus |
| Micractinium | Eudorina | Oocystis |
| Mougeotia | Gomphosphaeria | |

Reservoir Algae Genera

| | | |
|---|---|---|
| Chara | Audouinella | Compsopogon |
| Phormidium | Tetraspora | Batrachospermum |
| Ulothrix | Achnanthes | Cymbella |
| Cladophora | Stigeoclonium | Bulbochaete |
| Gomphonema | Lyngbya | Draparnaldia |

It should also be recognized that the use of algicidal 4,5 diaminouracil sulfate compounds should not be restricted to any particular area of application. The scope of this invention should encompass the use of this compound in waters of all types, such as lakes, rivers, streams, reservoirs, ponds, oceans as well as recirculating industrial waters and swimming pools. Furthermore, the 4,5 diaminouracil sulfate compounds of the present invention are also advantageous in that they are biodegradable with none of the degradation products, being toxic to fish and most fish food organisms at algae killing concentrations.

Another important advantage of 4,5 diaminouracil sulfate compounds in their algicidal applications is that they can be made up in solid or liquid formulations. Examples of solid formulations are dust, wettable powders, granules and pellets known to the art. Solid formulations, particularly floating solid formulations, may be preferred in combating algae which grow on surface waters. As a dust, 4,5 diaminouracil sulfate compounds may be dispersed in powdered solid carriers such as talc, soaps, soapstone, attapulgus clay as well as other finely divided solids. When formulated as wettable powders, the active component may be employed in conjunction with inert fillers which may be of the clay type carrier or non-clay type, in conjunction with various combinations of wetting agents and emulsifiers which may permit the adaptation of these concentrations as free-flowing powders. Each of these carriers may contain one or more 4,5 diaminouracil sulfate compounds together with other carriers which are ordinarily non-reacting or inert substances such as sand, clays, talc, sawdust, alkaline earth carbonates, oxides, phosphates and the like, as well as diatomaceous earth, micas or other suitable materials.

When liquid formulations are desired, liquid extenders, dilutants or carriers of a non-reactive nature may be utilized. These compositions should contain approximately 0.1 to 20 percent by weight and preferably 1 to 10 percent and most preferably 1 to 3 percent of the active 4,5 diaminouracil sulfate ingredient. Solvents which may be used in the preparation of such compositions would include alcohols, ketones, glycols, mineral spirits and aromatic solvents such as benzene, xylene, nitrobenzene and dimethylformide. Furthermore, to assist in rapid and complete dispersion in water systems, these compositions may also contain approximately 5 to 30 percent by weight and preferably 10 to 15 percent by weight of surface-active agents. Suitable surface-active agents include sodium dialkyl sulphates, sodium alkylbenzene sulfonates, sodium carboxylates and nonionic surfactants such as ethoxylated fatty acid alcohols and amines.

Where it is desired to use wettable powders or liquid formulations, either emulsified, dispersed or suspended in water or other fluids, one or more of the class of materials herein referred to as adjuvants may also be incorporated into the powder, dust or liquid formulation. These adjuvants may comprise surface active agents, detergents, wettable agents, stabilizers, dispersing and conditioning agents generally. Through their modifying characteristics these adjuvants may facilitate handling and application may enhance or potentiate the algicidal activities of this compound by methanisms which are frequently not well understood. A satisfactory but not exhaustive list of these adjuvants appears in "Soap Chemical Specialties," Volume 31, No. 7, Page 61; No. 8, Pages 48–61; No. 9, Pages 52–67 and No. 10, Pages 38–67 (1955). See also bulletin No. 607 of the Bureau of Entomology and Plant Quarantine of the United States Department of Agriculture.

An additional advantage of the 4,5 diaminouracil sulfate compositions of this invention is their compatability with a wide variety of other algicidal, bactericidal and fungicidal materials. For example, it may be convenient to combine one or more 4,5 diaminouracil sulfate compositions with one or more other bactericides, fungicides or algicides such as sulphur or inorganic salts such as copper sulphate, activated colloidal silver compounds, copper naphthenate and zinc acetate as well as substituted hydrocarbons and quarternary ammonium compounds, amines and antibiotics.

It should be recognized that other considerations may make some methods of application more favored than others. These considerations may include the type of organisms on which the compound is to be administered, the degree of activity, the degree of inhibition toward the algae organism and possible environmental side effects. Also to be considered is the cost of production and the characteristic solubility of the compounds into which the 4,5 diaminouracil sulfate may be introduced.

The applicants have discovered that, in their algicidal aspects, the 4,5 diaminouracil sulfate compounds of this invention are active algicides at relatively low concentrations. For example, it has been discovered that these compounds have imparted a high degree of algicidal activity at concentrations as low as 0.1 ppm. The amount of active ingredient added to the water will, of course, vary depending upon such factors as the type of algae present, the nature of the body of water, i.e., flowing stream versus small lake, etc., and the inherent ability of the body of water to support algae growth. This inherent ability in turn depends upon such factors as exposure to sunlight, PH, nutrient capabilities and the like. In most cases, however, the concentration of 4,5 diaminouracil sulfate required to kill or inhibit growth of algaes will vary from 0.1 to 100 ppm with the preferred range being 10 to 20 ppm.

The compounds of this invention can be added to the water according to conventional techniques for algicide application. When treating a lake or body of water which is relatively calm, the conventional procedure is to spray an aqueous solution of the algicide over the surface of the water. The 4,5 diaminouracil sulfate generally will be pre-dissolved in the types of solvents previously mentioned. In the case of the moving water, such as in water treatment plants or industrial facilities, the algicide can be added to the water in small amounts at periodic intervals. For economic reasons, volume usages such as in lakes, streams and reservoirs, will probably not exceed a concentration of 10 ppm.

Having thus disclosed our invention, we claim:

1. A method of killing, preventing and inhibiting the growth of algae which comprises applying an effective algicidal amount of 4,5 diaminouracil sulfate to the algae.
2. The method of claim 1 wherein the algae is Scenedesmus.
3. The method of claim 1 wherein the algae is Chlorella.
4. The method of claim 1 wherein the algae is Plectonema.
5. The method of claim 1 wherein the algae is Anacystis.
6. The method of claim 1 wherein the algae is Ankistrodesmus.
7. The method of claim 1 wherein the algae is Anabaena.
8. The method of claim 1 wherein the algae is Synura.
9. The method of claim 1 wherein the algae is Oscillatoria.
10. The method of claim 1 wherein the algae is Coccochloris.
11. The method of claim 1 wherein the algae is Chlamydomonas.
12. The method of claim 1 wherein the algae is Lyngbya.

* * * * *